US008265788B2

(12) United States Patent
Karnin et al.

(10) Patent No.: US 8,265,788 B2
(45) Date of Patent: Sep. 11, 2012

(54) SORTING MAIL IN CARRIER WALK SEQUENCE

(75) Inventors: Ehud D. Karnin, Koranit (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/045,042

(22) Filed: Mar. 10, 2008

(65) Prior Publication Data

US 2009/0223877 A1 Sep. 10, 2009

Related U.S. Application Data

(63) Continuation of application No. 10/989,951, filed on Nov. 15, 2004, now Pat. No. 7,365,284.

(51) Int. Cl.
*G06F 17/00* (2006.01)
*G06K 9/00* (2006.01)
*B07C 5/00* (2006.01)

(52) U.S. Cl. ........ 700/223; 700/224; 700/219; 700/220; 700/221; 700/225; 700/227; 700/228; 700/229; 209/584; 209/546

(58) Field of Classification Search .................... 700/83, 700/223–226; 209/546, 583–584, 900
See application file for complete search history.

(56) References Cited

U.S. PATENT DOCUMENTS

| | | | | |
|---|---|---|---|---|
| 3,609,694 | A * | 9/1971 | Brenner et al. | 700/227 |
| 5,042,667 | A * | 8/1991 | Keough | 209/3.1 |
| 5,249,687 | A * | 10/1993 | Rosenbaum et al. | 209/3.3 |
| 5,287,271 | A * | 2/1994 | Rosenbaum | 705/7.12 |
| 2005/0279674 | A1 * | 12/2005 | Gillet | 209/584 |

* cited by examiner

*Primary Examiner* — Gene Crawford
*Assistant Examiner* — Yolanda Jones
(74) *Attorney, Agent, or Firm* — Dan Swirsky; AlphaPatent Associates Ltd.

(57) ABSTRACT

An automated mail sorting system including a display for displaying the image of an item of mail belonging to a carrier route, and input device for associating the image with any of a plurality of stations in a walking sequence of the carrier route, and a sorter having a reader for identifying the item of mail, to sorter for placing the item of mail in a location corresponding to the station in the walking sequence.

17 Claims, 7 Drawing Sheets

SORTING MAIL IN CARRIER WALK SEQUENCE

CROSS-REFERENCE TO RELATED APPLICATIONS

The subject Application is a continuation of U.S. patent application Ser. No. 10/989,951, filed 15 Nov. 2004, (now U.S. Pat. No. 7,365,284).

FIELD OF THE INVENTION

This invention relates to sorting mail in general, and more particularly to sorting mail pieces according to a mail carrier walk sequence.

BACKGROUND OF THE INVENTION

Automated mail sorting systems that are employed to facilitate the delivery of mail pieces, such as letters, postcards, and other parcels, typically scan each mail piece and utilize optical character recognition (OCR) hardware and software to read the destination mailing address indicated on the mail piece. Such systems typically sort mail pieces down to the level of the individual mail carrier at the local post office. The individual mail carrier typically then manually "cases" the mail in the carrier's route by reading the destination mailing address on a mail piece and placing the mail piece into a "case" having many pockets in an order consistent with the order or "walk sequence" of the delivery stops, or stations, on the carrier's route.

What typically prevents automated mail sorting from being performed down to the level of the carrier walk sequence is that the addresses on some mail pieces simply cannot be read using OCR. Thus, the mail carrier must either read and case such mail pieces manually, or must enter the addresses of such mail pieces into the sorting machine and associate the address entered with its associated mail piece, whereupon it may be cased automatically. Manually casing mail is labor intensive, often taking up to half of a mail carrier's work day. An automated mail sorting system that would sort mail down to the level of the carrier walk sequence while minimizing the amount of manual casing or data entry required would therefore be advantageous.

SUMMARY OF THE INVENTION

The present invention discloses an automated mail sorting system that sorts mail down to the level of the carrier walk sequence.

In one aspect of the present invention an automated mail sorting system is provided including a display for displaying the image of an item of mail belonging to a carrier route, an input device for associating the image with any of a plurality of stations in a walking sequence of the carrier route, and a sorter having a reader for identifying the item of mail, the sorter for placing the item of mail in a location corresponding to the station in the walking sequence.

In another aspect of the present invention the display is operative to display a visual representation of the stations.

In another aspect of the present invention the visual representation is of a sorting case having a plurality of pockets representing the stations.

In another aspect of the present invention the input device is operative to associate the image with any of the displayed pockets.

In another aspect of the present invention the sorter is operative to place the item of mail in a pocket in the sorting case corresponding to the station associated with the item of mail.

In another aspect of the present invention each of the stations is displayed with an associated station identifier.

In another aspect of the present invention the input device is operative to receive the station identifier as input.

In another aspect of the present invention the reader is operative to read an identifier indicated on the item of mail.

In another aspect of the present invention the display and input device are in off-site communication with the sorter.

In another aspect of the present invention the system further includes a database associating items of mail and addresses read therefrom, and a carrier walk sequence database associating addresses in the carrier route with their stations in the walking sequence.

In another aspect of the present invention the reader is operative to read any of the addresses from the first database and associate the address with any of the stations as indicated by the carrier walk sequence database.

In another aspect of the present invention the reader is operative to read an address from the item of mail and associate the address with any of the stations as indicated by the carrier walk sequence database if the reader successfully reads the address.

In another aspect of the present invention the carrier walk sequence database associates the addresses in the carrier route with pockets in a sorting case having a plurality of pockets representing the stations.

In another aspect of the present invention an automated mail sorting method is provided including displaying the image of an item of mail belonging to a carrier route, associating the image with any of a plurality of stations in a walking sequence of the carrier route, and identifying the item of mail, and placing the item of mail in a location corresponding to the station in the walking sequence.

In another aspect of the present invention the displaying step includes displaying a visual representation of the stations.

In another aspect of the present invention the displaying step includes displaying a visual representation of a sorting case having a plurality of pockets representing the stations.

In another aspect of the present invention the associating step includes associating the image with any of the displayed pockets.

In another aspect of the present invention the placing step includes placing the item of mail in a pocket in the sorting case corresponding to the station associated with the item of mail.

In another aspect of the present invention the displaying step includes displaying each of the stations with an associated station identifier.

In another aspect of the present invention the associating step includes receiving the station identifier as input.

In another aspect of the present invention the identifying step includes reading an identifier indicated on the item of mail.

In another aspect of the present invention the displaying and associating steps are performed in off-site communication with the sorter.

In another aspect of the present invention the method further includes providing a first database associating the items of mail and addresses read therefrom, and providing a carrier walk sequence database associating addresses in the carrier route with their stations in the walking sequence.

In another aspect of the present invention the method further includes reading any of the addresses from the first database and associating the address with any of the stations as indicated by the carrier walk sequence database.

In another aspect of the present invention the method further includes reading an address from the item of mail and associating the address with any of the stations as indicated by the carrier walk sequence database if the reader successfully reads the address.

In another aspect of the present invention the providing the carrier walk sequence database step includes providing where the carrier walk sequence database associates the addresses in the carrier route with pockets in a sorting case having a plurality of pockets representing the stations.

In another aspect of the present invention a computer program is provided embodied on a computer-readable medium, the computer program including a first code segment operative to display the image of an item of mail belonging to a carrier route, a second code segment operative to associate the image with any of a plurality of stations in a walking sequence of the carrier route, and a third code segment operative to identify the item of mail, and a fourth code segment operative to place the item of mail in a location corresponding to the station in the walking sequence.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
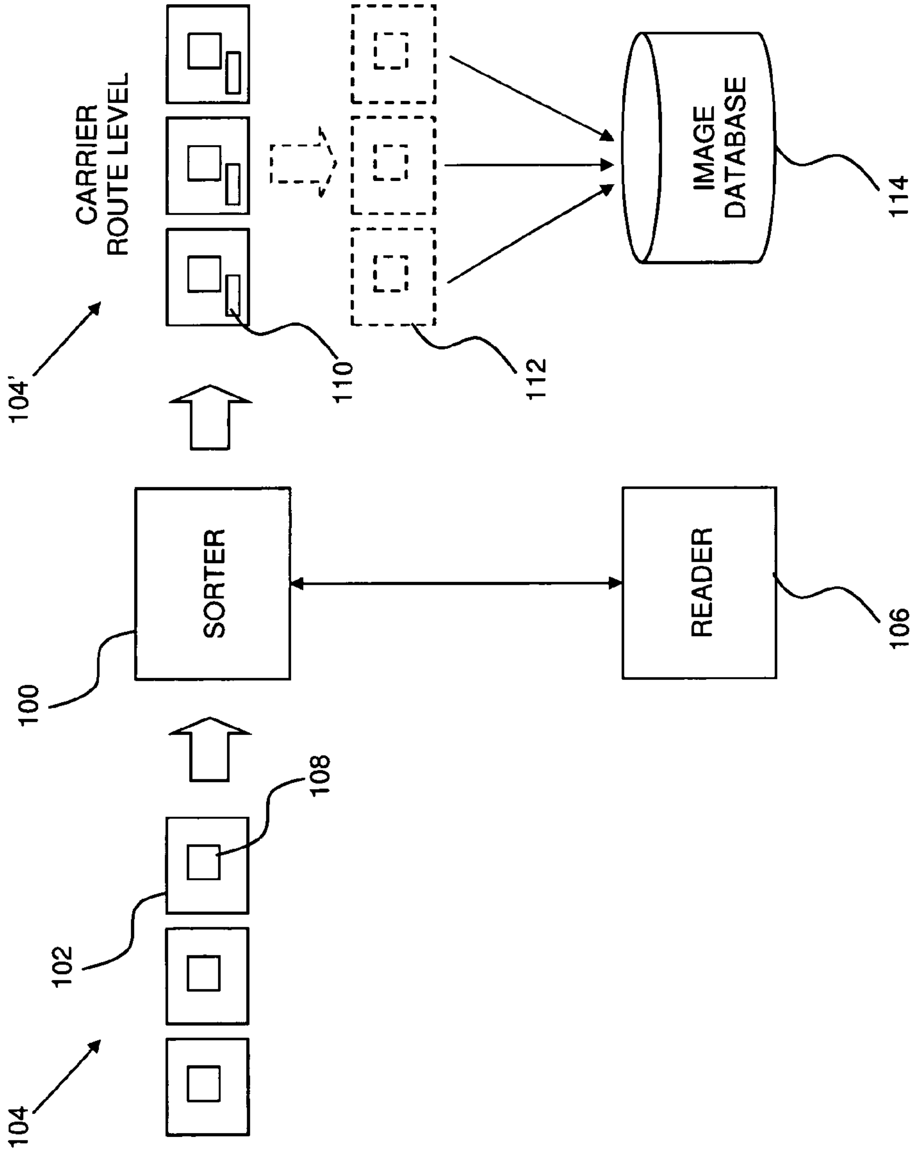
FIG. 1 is a simplified conceptual diagram of an automated mail sorting system, constructed and operative in accordance with a preferred embodiment of the present invention.

Reference is now made to FIG. 1, which is a simplified conceptual diagram of an automated mail sorting system, constructed and operative in accordance with a preferred embodiment of the present invention. In the system of FIG. 1, a sorter 100 receives an item of mail 102, such as a letter, postcard, parcel, or other mail item in a batch, generally designated 104, of mail parcels, and employs a reader 106 for reading the destination mailing address 108 indicated on item 102. Sorter 100 may be any suitable automated mail sorting device know in the art, while reader 106 may employ any suitable OCR hardware and/or software known for reading mail addresses. Sorter 100 preferably sorts each item of mail in batch 104 down to the level at which it belongs to a particular carrier route, shown as a batch 104', but which has not yet been sorted into a carrier walk sequence. This is typically accomplished by reading each item's ZIP code or equivalent using OCR or other techniques and by sorting accordingly. Sorter 100 also preferably places on each item of mail in batch 104 an identifier 110, such as a bar code, that uniquely identifies the item, and creates an image 112 of the item's destination mailing address, which may be in any known image format, such as TIFF or JPEG. Each identifier 110 is preferably associated with its image 112, which may then both be stored in a database 114.

Figure 2:
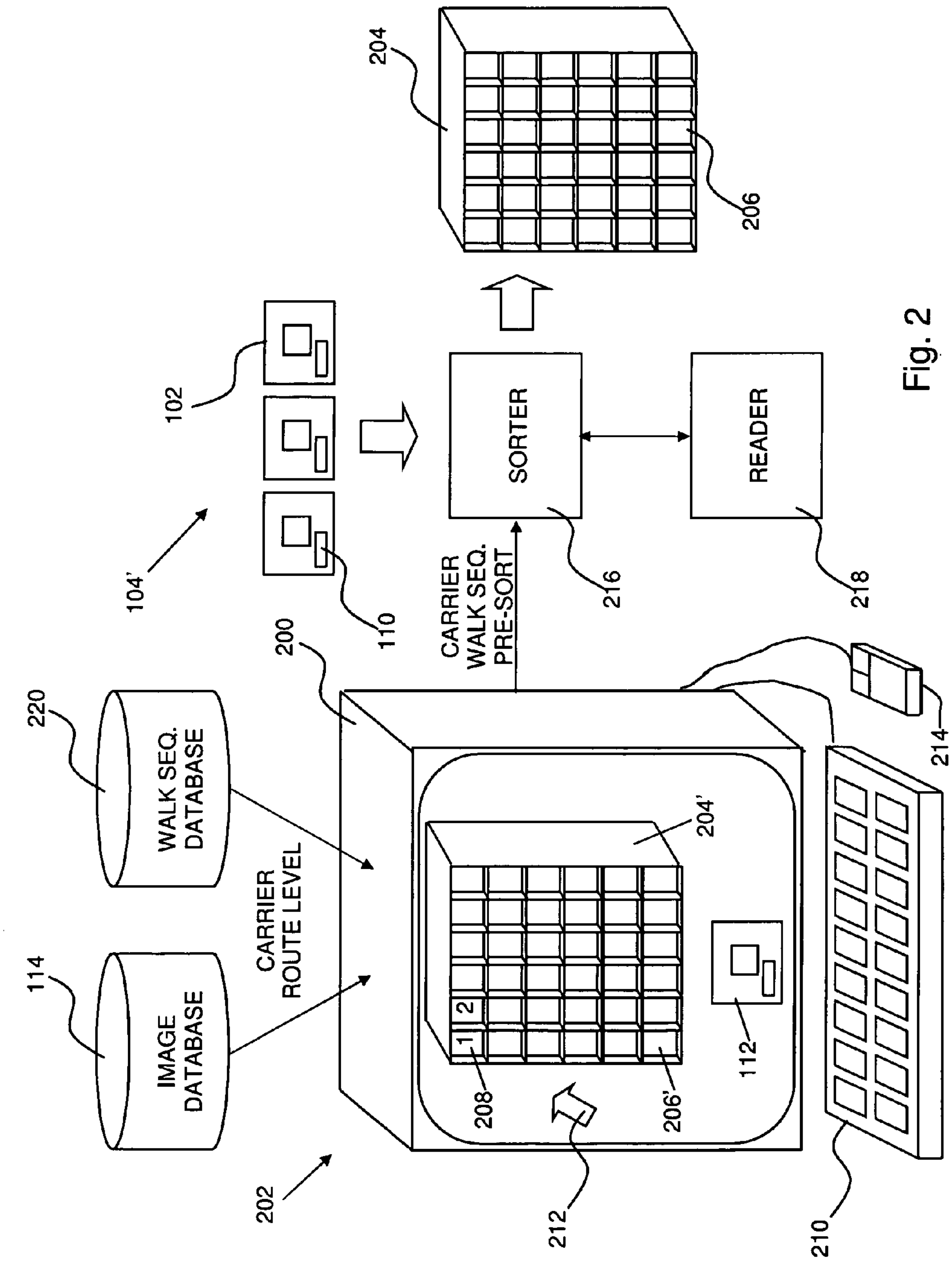
FIG. 2 is a simplified conceptual diagram of an automated mail sorting system, constructed and operative in accordance with a preferred embodiment of the present invention.
Figure 3:
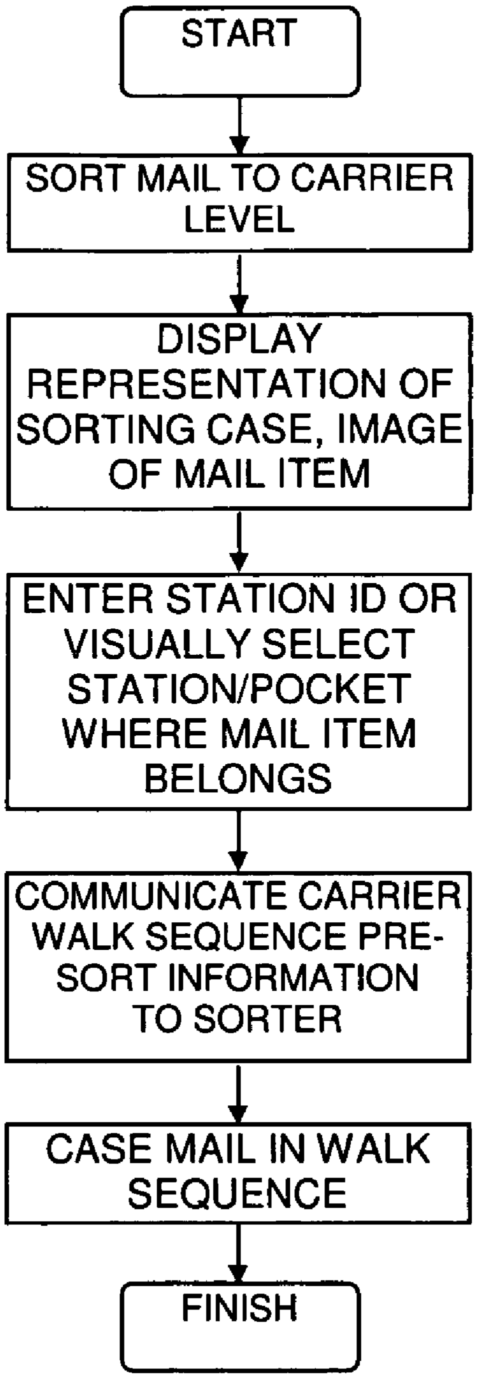
FIG. 3 is a simplified flowchart illustration of an exemplary method of operation of the system of FIG. 2, operative in accordance with a preferred embodiment of the present invention.

Reference is now made to FIG. 2, which is a simplified conceptual diagram of an automated mail sorting system, constructed and operative in accordance with a preferred embodiment of the present invention, and additionally to FIG. 3, which is a simplified flowchart illustration of an exemplary method of operation of the system of FIG. 2, operative in accordance with a preferred embodiment of the present invention. In the system of FIG. 2 and method of FIG. 3, the image 112 of each item of mail 102 in batch 104' (FIG. 1) that belongs to a particular carrier route are displayed, preferably one at a time, on a display 200 of a computer terminal 202. A visual representation of stations in a carrier walk sequence may also be displayed on display 200 at the same time. For example, a visual representation 204' of a physical sorting case 204 may be displayed on display 200, where sorting case 204 has one or more pockets 206, shown on display 200 as pockets 206'. Case 204 represents the route's corresponding carrier walk sequence as is preferably indicated in a carrier walk sequence database 220 that has been preconfigured to associate addresses in the carrier's route with their stations in the walking sequence and preferably also with their associated pockets 206 in sorting case 204. Visual representation 204' may be designed to portray the physical appearance of sorting case 204, where each pocket 206/206' may have an associated station identifier 208, or may simply provide a list of locations in the walking sequence together with station identifiers 208.

Once displayed, each image 112 that corresponds to an item 102 may then be associated with its appropriate station in the carrier walk sequence via an input device, such as by entering the appropriate station identifier 208 into terminal 202, such as via a keypad or keyboard 210, or by positioning a cursor 212 on display 200 with a pointing device 214 and pressing a selector on pointing device 214 to indicate the selection of a particular pocket 206'. If item 102 is not assignable to any station, such as where the address is correct but the carrier knows that the recipient has moved, this may likewise be indicated via keypad or keyboard 210 or pointing device 214 using any suitable predefined action. This 'virtual casing' may be performed by the carrier or other person who is familiar with the carrier's route, and may be performed at the post office or off-site, such as at the carrier's home via network link. The station to which item 102 is associated is then communicated as carrier walk sequence pre-sort information to a sorter 216. Sorter 216 typically employs a reader 218 for identifying each item 102 in batch 104', such as by reading the identifier 110 indicated on each item 102 in batch 104'. Sorter 216 then places item 102 in a location corresponding to the station in the carrier walk sequence with which item 102 is associated as indicated by the carrier walk sequence pre-sort information, such as in the pocket 206 corresponding to the pocket 206' with which item 102 is associated.

Figure 4:
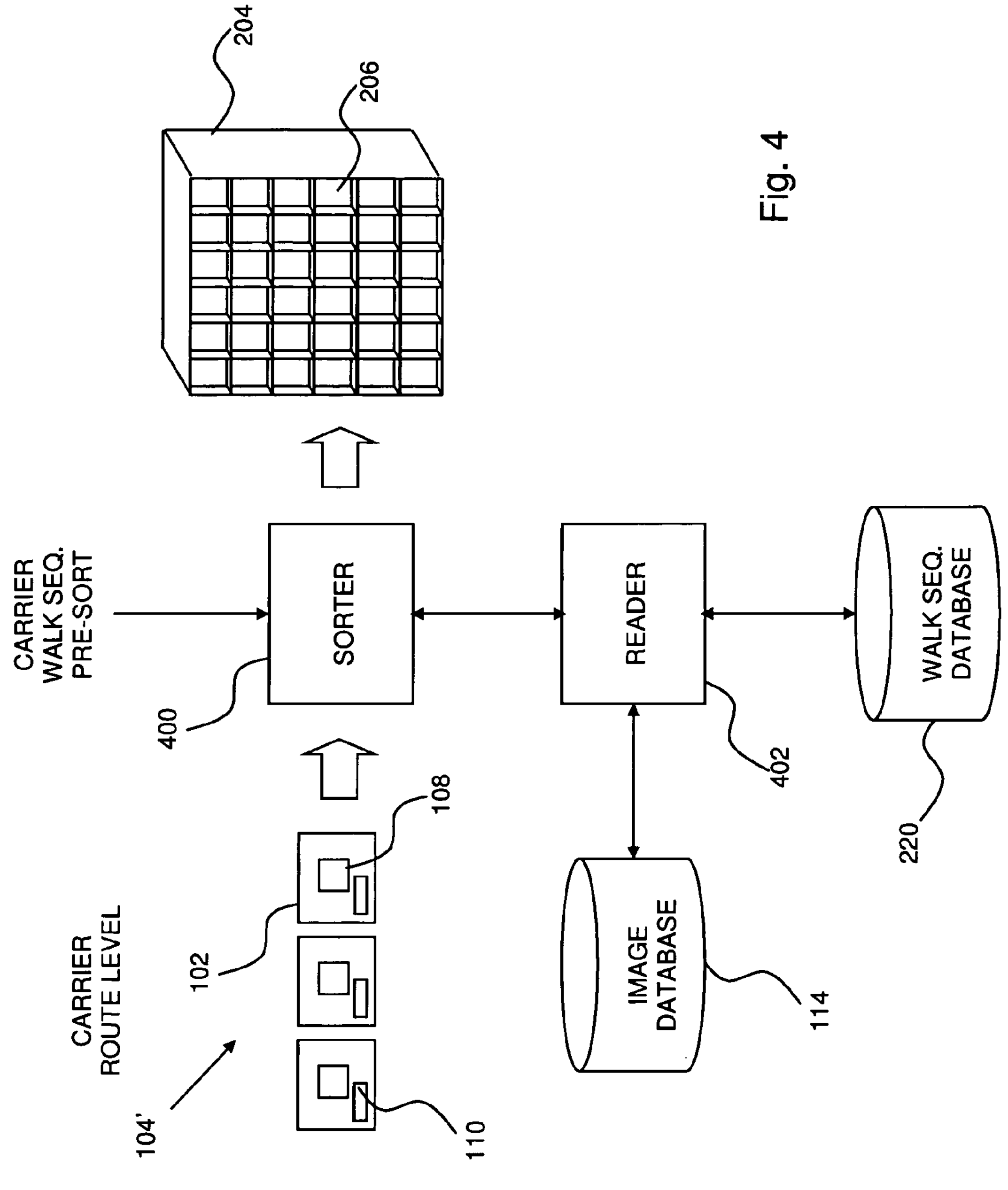
FIG. 4 is a simplified conceptual diagram of an automated mail sorting system, constructed and operative in accordance with a preferred embodiment of the present invention.
Figure 5:
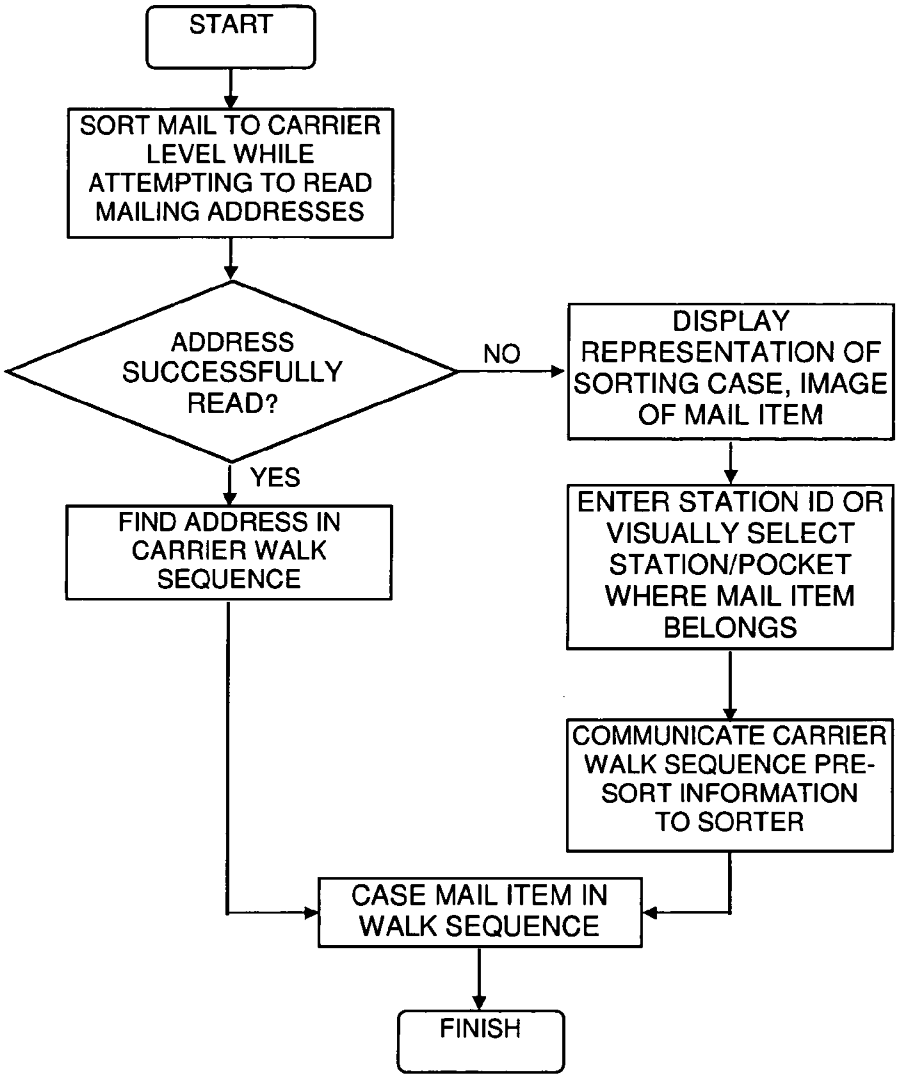
FIG. 5 is a simplified flowchart illustration of an exemplary method of operation of the system of FIG. 4, operative in accordance with a preferred embodiment of the present invention.

Reference is now made to FIG. 4, which is a simplified conceptual diagram of an automated mail sorting system, constructed and operative in accordance with a preferred embodiment of the present invention, and additionally to FIG. 5, which is a simplified flowchart illustration of an exemplary method of operation of the system of FIG. 4, operative in accordance with a preferred embodiment of the present invention. In the system of FIG. 4 and method of FIG. 5. an attempt is made by reader 106 to read the destination mailing address, beyond just the ZIP code or equivalent, on each item 102 in batch 104 using OCR (FIG. 1). Thus, each item of mail in batch 104' whose address is OCR-readable preferably arrives at sorter 216 (FIG. 2) with an already-read address, preferably stored in database 114. Those items of mail in batch 104' whose address is not OCR-readable may be displayed on display 200 and associated with their appropriate stations as described hereinabove with reference to FIGS. 2 and 3. This information is then communicated as carrier walk sequence pre-sort information to a sorter 400, which may then employ a reader 402 to read each identifier 110 of each item 102 in batch 104'. If item 102 has already been assigned to a station, sorter 400 may directly place item 102 in a location corresponding to the station in the carrier walk sequence with which item 102 is associated, such as in the pocket 206 corresponding to the station. If not, reader 402 may read each identifier 110 indicated on each item 102 in batch 104', retrieve its already-read address from database 114, and find the address in carrier walk sequence database 220 that has been preconfigured to associate addresses in the carrier's route with their stations in the walking sequence and preferably also with their associated pockets 206 in sorting case 204. Sorter 400 may then associate the address with the proper pocket 206 and place item 102 in a location corresponding to the station in the carrier walk sequence with which item 102 is associated, such as in the pocket 206 corresponding to the station.

Figure 6:
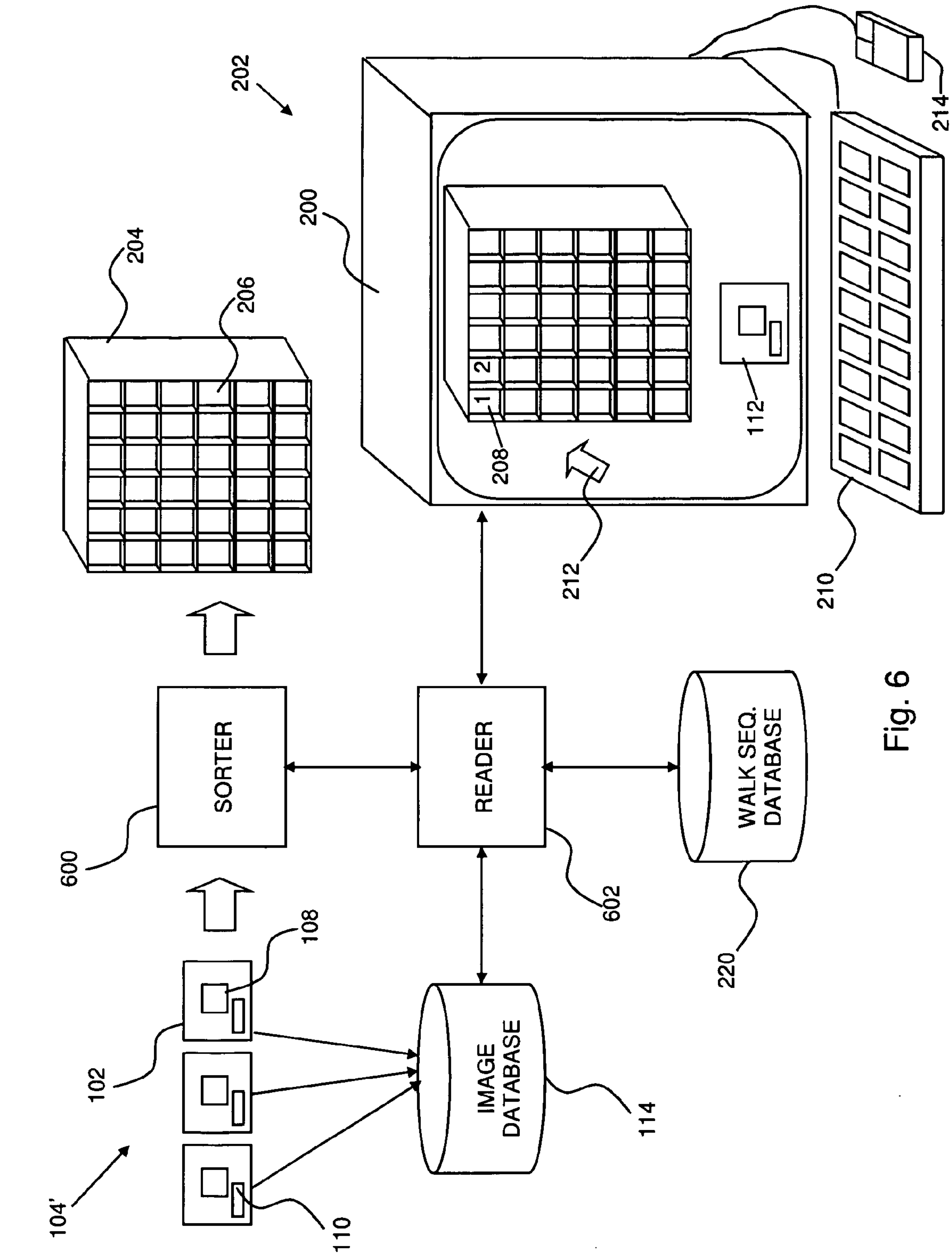
FIG. 6 is a simplified conceptual diagram of an automated mail sorting system, constructed and operative in accordance with a preferred embodiment of the present invention.
Figure 7:
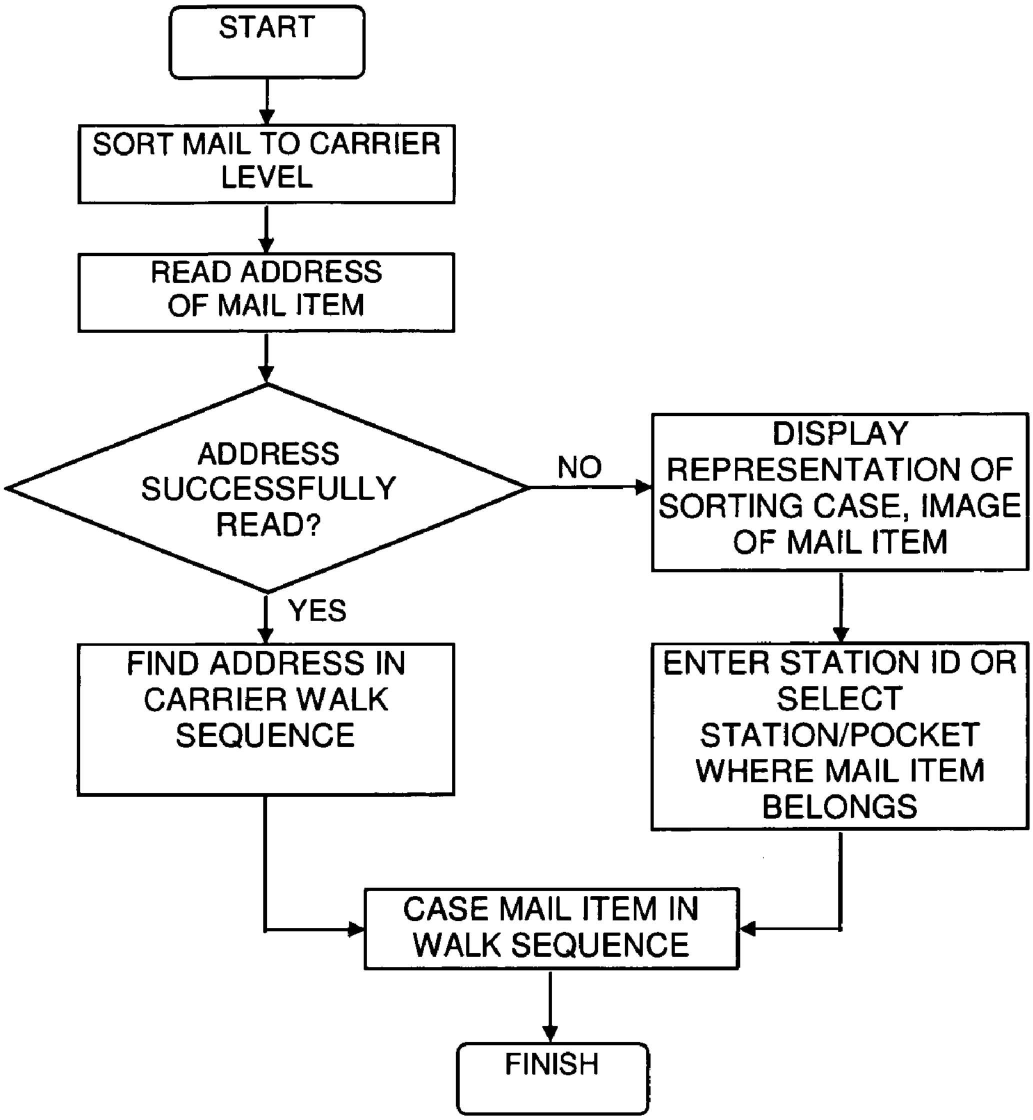
FIG. 7 is a simplified flowchart illustration of an exemplary method of operation of the system of FIG. 6, operative in accordance with a preferred embodiment of the present invention.

Reference is now made to FIG. 6, which is a simplified conceptual diagram of an automated mail sorting system, constructed and operative in accordance with a preferred embodiment of the present invention, and additionally to FIG. 7, which is a simplified flowchart illustration of an exemplary method of operation of the system of FIG. 6, operative in accordance with a preferred embodiment of the present invention. In the system of FIG. 6 and method of FIG. 7 a sorter 600 receives items of mail 102 in batch 104' (FIG. 1) that belongs to a particular carrier route, and employs a reader 602 which reads identifier 110, retrieves its associated image 112 from database 114, and reads the destination mailing address 108, either from image 112 directly from item 102. If reader 602 successfully reads the address it preferably finds the address in carrier walk sequence database 220 that has been preconfigured to associate addresses in the carrier's route with their stations in the walking sequence and preferably also with their associated pockets 206 in sorting case 204 (FIG. 2). Reader 602 then signals sorter 600 to place item 102 in a location corresponding to the station in the carrier walk sequence with which item 102 is associated, such as in the pocket 206 corresponding to the station. If reader 602 does not successfully read the address, image 112 of item 102 may be displayed on display 200 and associated with its appropriate station as described hereinabove with reference to FIGS. 2 and 3. This information is then communicated to sorter 600 which then places item 102 in a location corresponding to the station in the carrier walk sequence with which item 102 is associated, such as in the pocket 206 corresponding to the station.

The assigning of unsuccessfully read mail items to their place in the carrier walk sequence may be performed while sorter 600 sorts successfully read mail items into their assigned locations, such as in sorting case 204. Alternatively, the processing and sorting of unsuccessfully read mail items as described hereinabove may be performed as a batch, after all successfully read mail items have been sorted, with unsuccessfully read mail items being put aside and later resubmitted to sorter 600 after they have been assigned to their stations as described hereinabove.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware of software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An automated mail sorting system comprising:

a computer having a display and an input device, wherein said computer is configured to display on said display an image of an item of mail, and receive via said input device, while said image of said item of mail is displayed on said display, an input including a carrier walk sequence station identifier associating said item of mail with a station in a carrier walk sequence of a carrier route, and an automated mail sorting device configured to receive from said computer said carrier walk sequence station identifier associating said item of mail with said station, and place said item of mail in a physical location corresponding to said station in said carrier walk sequence.

2. The system according to claim 1 wherein said physical location is a pocket in a sorting case.

3. The system according to claim 1 and further comprising:

a database associating items of mail and addresses read therefrom; and a carrier walk sequence database associating addresses in said carrier route with their stations in said carrier walk sequence.

4. The system according to claim 3 and further comprising a reader operative to read any of said addresses from said first database and associate said address with any of said stations as indicated by said carrier walk sequence database.

5. The system according to claim 3 and further comprising a reader operative to read an address from said item of mail and associate said address with any of said stations as indicated by said carrier walk sequence database if said reader successfully reads said address.

6. The system according to claim 3 wherein said carrier walk sequence database associates said addresses in said carrier route with pockets in a sorting case having a plurality of pockets representing said stations.

7. An automated mail sorting method comprising:

displaying on a display of a computer an image of an item of mail;

receiving via an input device of said computer, while said image of said item of mail is displayed on said display, an input including a carrier walk sequence station identifier associating said item of mail with a station in a carrier walk sequence of a carrier route; and communicating to an automated mail sorting device said carrier walk sequence station identifier associating said item of mail with said station, thereby causing said automated mail sorting device to place said item of mail in a physical location corresponding to said station in said carrier walk sequence.

8. The method according to claim 7 and further comprising configuring said automated mail sorting device to associate said physical location with a pocket in a sorting case.

9. The method according to claim 7 and further comprising:

accessing a database associating items of mail and addresses read therefrom; and accessing a carrier walk sequence database associating addresses in said carrier route with their stations in said carrier walk sequence.

10. The method according to claim 9 and further comprising reading any of said addresses from said first database and associating said address with any of said stations as indicated by said carrier walk sequence database.

11. The method according to claim 9 and further comprising reading an address from said item of mail and associating said address with any of said stations as indicated by said carrier walk sequence database if said reader successfully reads said address.

12. The method according to claim 9 and further comprising associating said addresses in said carrier route with pockets in a sorting case having a plurality of pockets representing said stations.

13. A computer program product on a computer readable medium for automated mail sorting, the computer program product comprising:

a computer-readable storage medium; and computer-readable program code embodied in the computer-readable storage medium, wherein the computer-readable program code is configured to display on a display of a computer an image of an item of mail, receive via an input device of said computer, while said image of said item of mail is displayed on said display, an input including a carrier walk sequence station identifier associating said item of mail with a station in a carrier walk sequence of a carrier route, and communicate to an automated mail sorting device said carrier walk sequence station identifier associating said item of mail with said station, thereby causing said automated mail sorting device to place said item of mail in a physical location corresponding to said station in said carrier walk sequence.

14. The computer program product according to claim 13 wherein the computer-readable program code is configured to access a database associating items of mail and addresses read therefrom, and access a carrier walk sequence database associating addresses in said carrier route with their stations in said carrier walk sequence.

15. The computer program product according to claim 14 wherein the computer-readable program code is configured to read any of said addresses from said first database and associate said address with any of said stations as indicated by said carrier walk sequence database.

16. The computer program product according to claim 14 wherein the computer-readable program code is configured to read an address from said item of mail and associate said address with any of said stations as indicated by said carrier walk sequence database if said reader successfully reads said address.

17. The computer program product according to claim 14 wherein the computer-readable program code is configured to associate said addresses in said carrier route with pockets in a sorting case having a plurality of pockets representing said stations.

* * * * *